United States Patent
Acosta et al.

(10) Patent No.: US 7,834,499 B2
(45) Date of Patent: Nov. 16, 2010

(54) MOTOR ASSEMBLY FOR WINDOW LIFT APPLICATIONS

(75) Inventors: Louis E. Acosta, Gainesville, GA (US); Barry Anderson, Suwanee, GA (US); Yakov Fleytman, Flowery Branch, GA (US)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 305 days.

(21) Appl. No.: 12/000,603

(22) Filed: Dec. 14, 2007

(65) Prior Publication Data

US 2009/0121568 A1    May 14, 2009

Related U.S. Application Data

(60) Provisional application No. 60/996,309, filed on Nov. 9, 2007.

(51) Int. Cl.
*H02K 7/06* (2006.01)
*F16H 29/00* (2006.01)

(52) U.S. Cl. ............ 310/75 R; 310/96; 310/98; 310/99; 310/100; 74/89.14; 74/89.17

(58) Field of Classification Search ............ 310/75 R, 310/78, 80, 83, 75 D, 92, 96, 98, 99, 100; 192/12 B, 15, 55.1, 56.1, 223, 233.2; 74/89.14, 74/89.16, 89.34, 425, 606 R, 89.17, 89.18, 74/421 A; 475/149, 343, 425; 49/349, 358, 49/362

See application file for complete search history.

(56) References Cited

U.S. PATENT DOCUMENTS 5,937,507 A * 8/1999 Asakura et al. .............. 29/596

(Continued)

FOREIGN PATENT DOCUMENTS

| DE | 20113687 U1 | 1/2002 |
| DE | 102005012938 A1 | 9/2006 |
| DE | 69838820 T2 | 10/2008 |

OTHER PUBLICATIONS

Niemann, G.: Mashinenelemente.Zweiter Band Getriebe.2. berichtigter Neudruck Berlin/Heidelberg/New York: Springer-Verlag, 1965.

(Continued)

*Primary Examiner*—Tran N Nguyen
(74) *Attorney, Agent, or Firm*—Manelli Denison & Selter PLLC; Edward J. Stemberger

(57) ABSTRACT

A motor assembly (10) includes a permanent magnet DC motor (16) having a shaft (24) mounted for rotation with a face gear pinion (26) associated with the shaft. A jack shaft and clutch assembly (18) is associated with the face gear pinion and is constructed and arranged to prevent back drive of the motor under certain operating conditions. A spur or helical pinion (40) is operatively associated with the jack shaft and clutch assembly. A drive member (56) is operatively associated with the spur or helical pinion such that movement of the shaft and face gear pinion moves the spur or helical pinion to drive the drive member. A housing structure is defined by an upper housing (14) joined with a lower housing (12). The motor, the face gear pinion, the jack shaft and clutch assembly, the spur or helical pinion and the drive member are housed within the housing structure. Only one of the upper or lower housings includes mounting structure (25) constructed and arranged to mount the motor assembly to another object.

11 Claims, 3 Drawing Sheets

U.S. PATENT DOCUMENTS

| | | | | |
|---|---|---|---|---|
| 5,979,256 | A | * | 11/1999 | Kilker et al. ................ 74/89.16 |
| 6,018,223 | A | * | 1/2000 | Oruganty et al. ............... 318/10 |
| 6,075,298 | A | * | 6/2000 | Maue et al. .............. 310/12.14 |
| 6,215,209 | B1 | | 4/2001 | Yamamoto |
| 7,098,562 | B2 | | 8/2006 | Oh |
| 7,353,930 | B2 | * | 4/2008 | Acosta ....................... 192/223 |
| 7,363,995 | B2 | * | 4/2008 | Downs et al. .............. 180/65.1 |
| 2005/0073205 | A1 | | 4/2005 | Takagi et al. |
| 2006/0071567 | A1 | | 4/2006 | Acosta |
| 2006/0175175 | A1 | | 8/2006 | Acosta |

OTHER PUBLICATIONS

German Office Action in corresponding German Application No. 102008043569.4-22, dated May 7, 2010.

* cited by examiner

MOTOR ASSEMBLY FOR WINDOW LIFT APPLICATIONS

This application claims the benefit of the earlier filing date of U.S. Provisional Application No. 60/996,309, filed on Nov. 9, 2007, which is incorporated by reference herein in its entirety.

FIELD OF THE INVENTION

The present invention relates to motor assemblies for automotive applications and, more particularly, to a cost-effective window lift motor assembly having a bi-directional friction clutch mechanism.

BACKGROUND OF THE INVENTION

Conventional window lift motor assemblies include some basic components such as the gear or transmission housing, worm and gear arrangement (including a driver geometry to interface with the window regulator), motor housing (usually a metal drawn component) magnets, bearings, brush card, armature assembly and miscellaneous hardware components.

There is a need to reduce cost and size by increasing the gear train efficiency of a window lift motor assembly such that a smaller motor assembly can provide sufficient speed and torque required by a specific application. Since motor efficiency is increased, a clutch brake mechanism is needed to prevent back drive from an external source.

SUMMARY OF THE INVENTION

An object of the invention is to fulfill the need referred to above. In accordance with the principles of an embodiment of the present invention, a motor assembly includes a permanent magnet DC motor having a shaft mounted for rotation, with a face gear pinion associated with the shaft. A jack shaft and clutch assembly is associated with the face gear pinion and is constructed and arranged to prevent back drive of the motor under certain operating conditions. A spur or helical pinion is operatively associated with the jack shaft and clutch assembly. A drive member is operatively associated with the spur or helical pinion such that rotation of the shaft and face gear pinion moves the spur or helical pinion to drive the drive member. A housing structure is defined by an upper housing joined with a lower housing. The motor, the face gear pinion, the jack shaft and clutch assembly, the spur or helical pinion and the drive member are housed within the housing structure. Only the upper housing includes a mounting structure constructed and arranged to mount the motor assembly to another object. The lower housing structure remains common to all motor applications.

In accordance with another aspect of the invention, a method of assembling a motor assembly is provided. The motor assembly includes a permanent magnet DC motor having a commutator and a shaft mounted for rotation, a face gear pinion associated with the shaft, a clutch assembly associated with the face gear pinion and constructed and arranged to prevent back drive of the motor under certain operating conditions, one of a spur or helical pinion operatively associated with the clutch assembly, and a drive member operatively associated with the spur or helical pinion such that movement of the shaft and face gear pinion moves the spur or helical pinion to drive the drive member. The method provides an upper housing and a lower housing. Each housing has mating surfaces and a pocket constructed and arranged to receive a portion of the motor. The brushes are supported directly in one of the upper or lower housings. A portion of the motor is received in the pocket of one of the housings so that the brushes engage the commutator. Another portion of the motor is received in the pocket of the other housing with the mating surfaces of the housings being adjacent to one another. Thus, the motor, the face gear pinion, the clutch assembly, the spur or helical pinion and the drive member are housed between the upper and lower housings.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
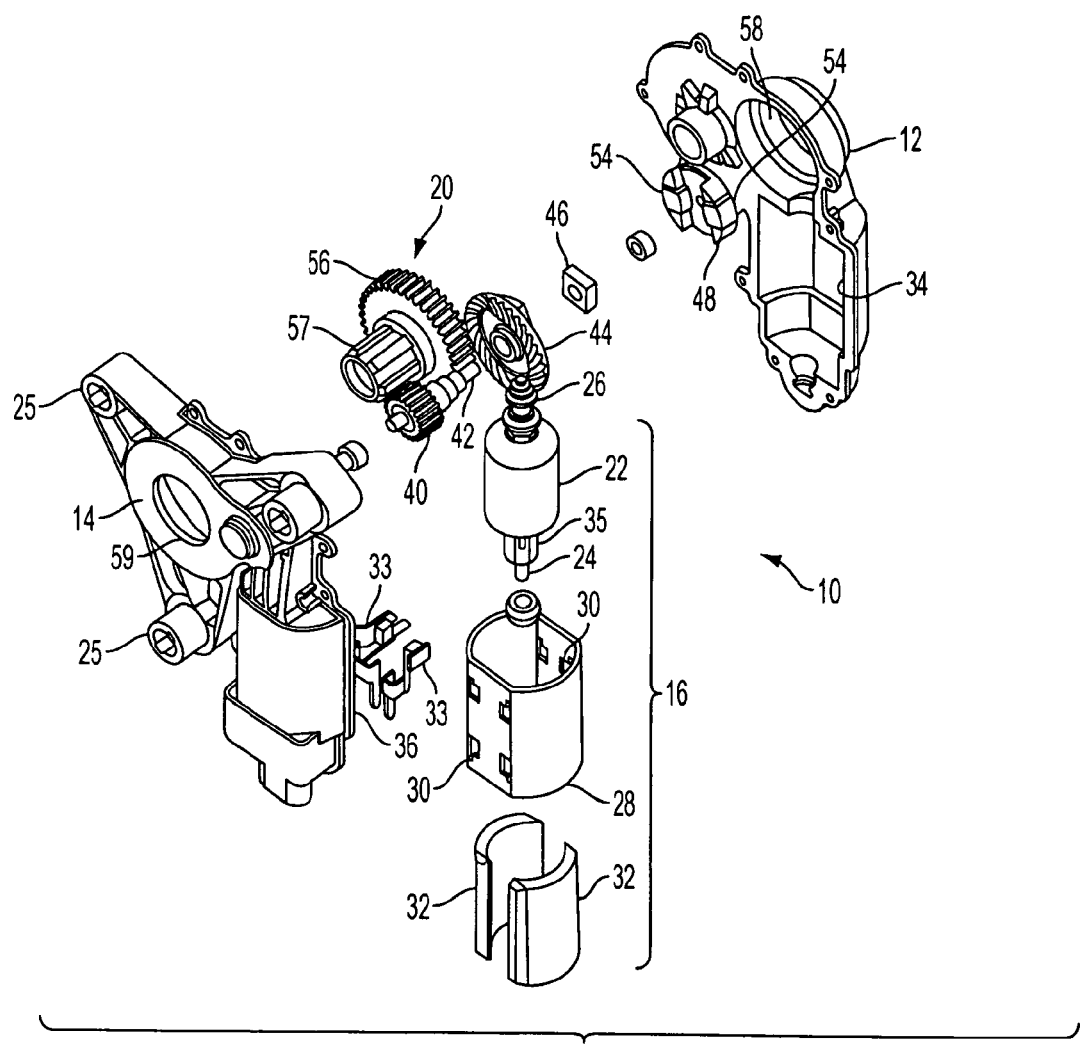
FIG. 1 is an exploded view of a window lift motor assembly provided in accordance with an embodiment of the invention.
Figure 2:
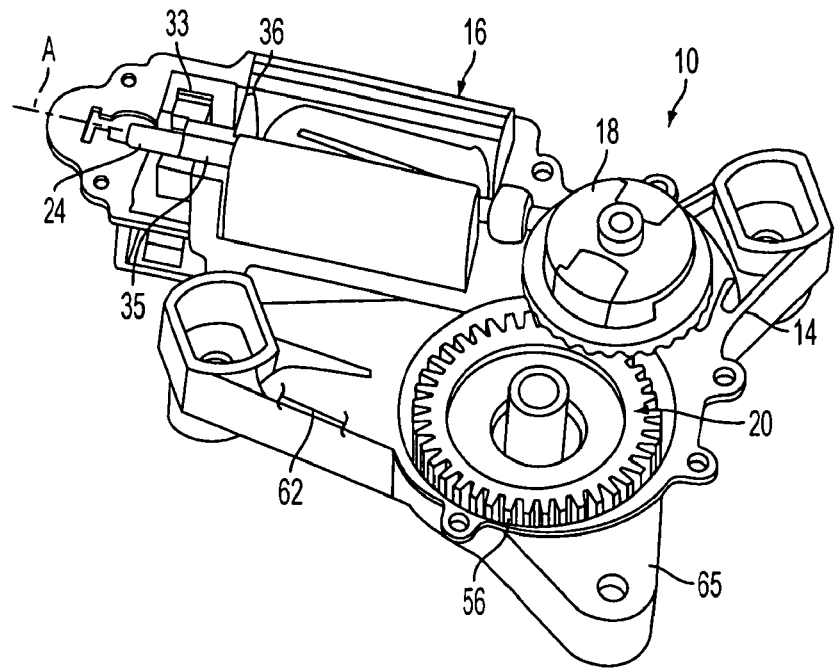
FIG. 2 is a view of a window lift motor assembly of FIG. 1, shown disposed in an upper housing with the lower housing removed and some items shown in a transparent manner for clarity of illustration.
Figure 3:
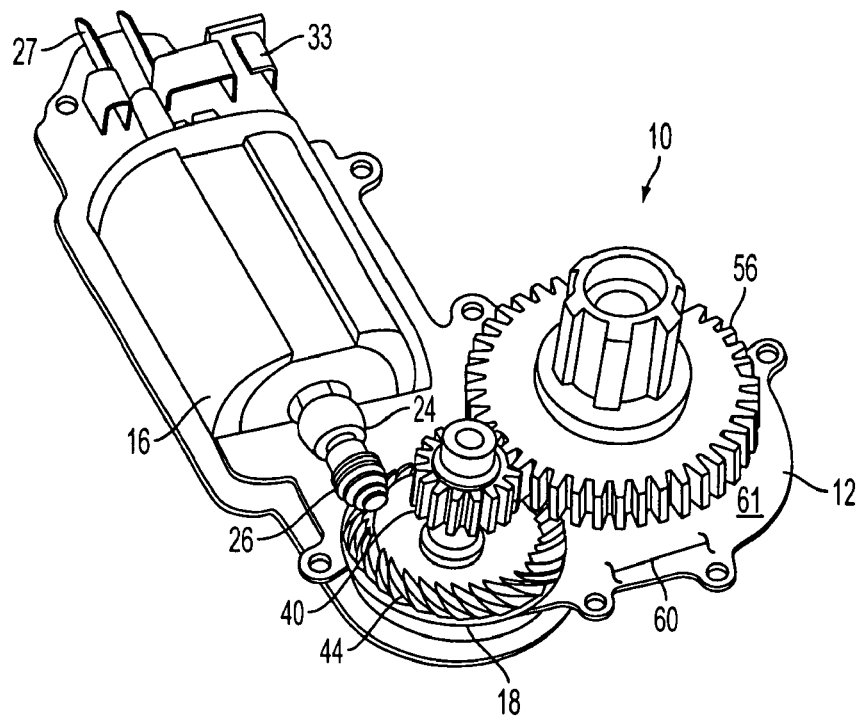
FIG. 3 is a view of a window lift motor assembly of FIG. 1, shown disposed in the lower housing with the upper housing removed and some items shown in a transparent manner for clarity of illustration.

With reference to FIGS. 1-3, a window lift motor assembly is shown, generally indicated at 10, in accordance with the principles of an embodiment of the invention. The assembly 10 includes housing structure defined by a lower housing 12 and an upper housing 14. A permanent magnet DC motor, generally indicated at 16, a jack shaft and clutch assembly 18, and a gear train, generally indicated at 20 are housed between the lower and upper housings 12 and 14.

The housing structure is split into the lower and upper housings 12 and 14 along a plane coincident to the axis A of a shaft 24 of an armature assembly 22 thus simplifying assembly of the motor assembly 10 and allowing for the elimination of a brush card body and bearing retainers of conventional motor assemblies. The housing structure provides room for other components normally found on a brush card, such as a thermal protector, capacitors, varistors, and inductors. The housing 12 and 14 can be joined together by means of a snap mechanism or by fasteners. It is preferable that one of the housings, e.g., housing 12, is common to all motor assemblies 10 with the other housing 14 providing custom mounting patterns and mounting structure 25 as required by each customer for mounting with respect to portion of a vehicle so that the motor assembly 10 can move a window of the vehicle.

Figure 4:
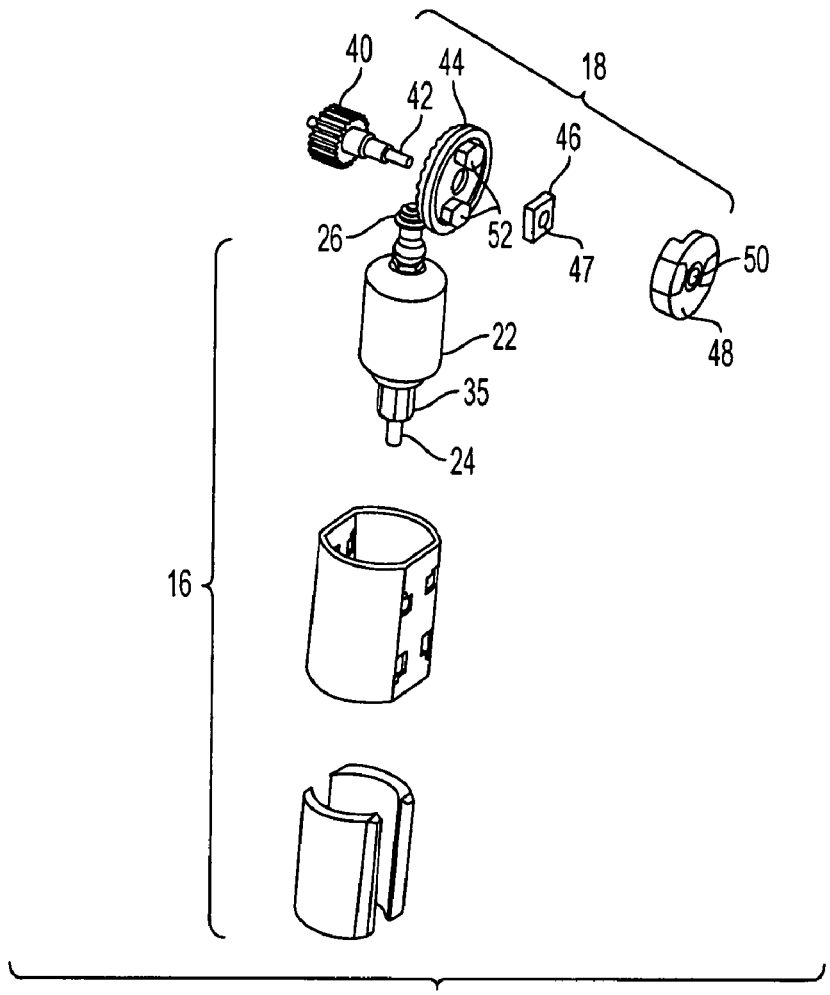
FIG. 4 is an exploded view of the motor and clutch assembly of the motor assembly of FIG. 1.
Figure 5:
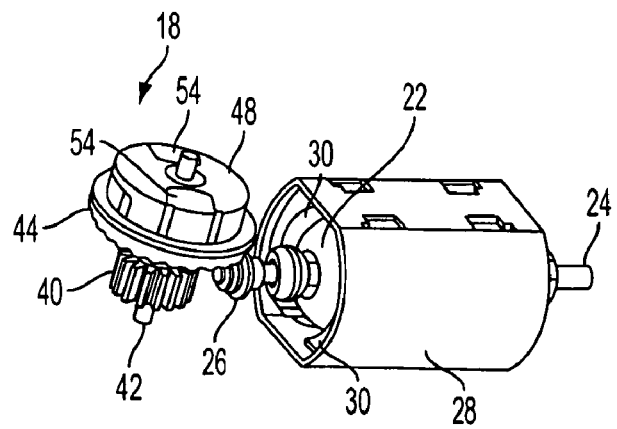
FIG. 5 is an assembled view of the motor and clutch assembly of FIG. 3.

With reference to FIGS. 4 and 5, the motor 16 includes the conventional armature assembly 22 having the shaft 24 mounted for rotation. An end of the shaft 24 includes a face gear pinion 26 (coupled to or integral therewith), the functions of which with be explained below. A flux ring 28 is provided about the armature assembly 22 and provides a path for the magnetic field. The flux ring 28 includes retaining features 30 of the type disclosed in U.S. Patent Application Publication No. 2006/0071567 A1, the content of which is hereby incorporated by reference into this specification, for retaining the permanent magnets 32 therein. Thus, there is no need for separate magnet clips or glue as used in some conventional motors. Each housing 12 and 14 includes a respective pocket 34 and 36 that receives a portion of the motor 16 such that a separate housing is not required to be provided over the flux ring 28.

Brushes 33, preferably in the form of leaf springs, are directly supported in one of the housings 12 or 14 and engage the commutator 35 of the armature assembly 22. Thus, no brush card is required. An electrical connector 27 can be integrated into one of the housings 12 or 14 to power the brushes 33. Thus, the housing structure incorporates connector geometry to interface with a mating connector of a customer.

The jack shaft and clutch assembly 18 is associated with the face gear pinion 26 and is shown in exploded view in FIGS. 1 and 4 and is of the type disclosed in U. S. Patent Application Publication No. 2006/0175175 A1, the content of which is hereby incorporated by reference into this specification. The jack shaft and clutch assembly 18 includes a spur or helical pinion 40 fixedly mounted on an end of a jack shaft 42, a face gear 44, a cam 46 and a clutch plate 48. In the illustrated embodiment, the face gear 44 and the spur or helical pinion 40 each define gears, but it can be appreciated that these structures can be configured as pulleys for use in a belt driven system. The spur or helical pinion 40, engaged with a drive member 56 can be considered to be part of the gear train 20.

The cam 46 has a bore 47 that receives an end of the jack shaft 42 in a fixed manner so that movement of the cam 46 moves the shaft 42. The end of the shaft 42 extends through a bore 50 in the clutch plate 48 so that the clutch plate 48 freely rotates about the jack shaft 42. The face gear 44 is mounted so as to freely rotate with respect to the shaft 42.

As best shown in FIG. 3, the face gear 44 also includes engagement members 52 extending there-from.

As best shown in FIG. 1, the clutch plate 48 includes two followers 54 disposed in opposing relation and extending from the clutch plate 48. The followers 54 are preferably molded as an integral part of the clutch plate 48, but the followers 54 can be fully detached from the clutch plate 48.

If the armature assembly 22 is the driving element (normal operation), the face gear 44 will be driven by another component, be it the face gear pinion 26, a gear, or a belt (in the case of a belt drive), allowing the motor assembly 10 to operate as intended, where the cam 46 moves the jack shaft 42 and thus the spur or helical pinion 40 engaged with a drive member 56 (e.g., output gear), as disclosed in U. S. Patent Application Publication No. 2006/0175175 A1. Driver 57 of gear 56 extends through opening 59 in housing 14 and can be associated with a window to raise and lower the window.

In an initial back drive condition, when the spur or helical pinion 40 becomes the driving element, the jack shaft 42 will turn along with the cam 46 as disclosed in U. S. Patent Application Publication No. 2006/0175175 A1. Torque on the jack shaft 42 causes the cam 46 to rock with respect to engagement members 52 of the face gear 44 and thereby engages the followers 54 of the clutch plate 48. Since the rectangular cam 46 is rotated, the followers 54 are pressed on the inner race 58 (housing 12 inner diameter surface, FIG. 1), locking the shaft 42 and thus the motor 16 due to friction, preventing back drive.

The two part housing structure can also provide seal structure for motor sealing by insert molding a rubber seal 60 (a portion of which is shown in FIG. 3) around the periphery of a surface 61 of one of the housings, e.g., housing 12 and providing a seal gland 62 (a portion of which is shown in FIG. 2) on a mating surface 65 in the other housing, e.g., housing 14. A lip seal can also be molded to fit around the output drive member 56.

A method of assembling the motor assembly 10 includes supporting the brushes 33 directly in the housing 14. A portion of the motor 16 is received into the pocket 36 of the housing 14 so that the brushes 33 engage the commutator 35. Another portion of the motor 16 is received in the pocket 34 of the other housing 12 with the mating surfaces of the housings being adjacent to one another. Thus, the motor 16, the face gear pinion 26, the jack shaft and clutch assembly 18, the spur or helical pinion 40 and the drive member 56 are housed between the housings 12 and 14.

The motor assembly 10 is preferably configured as a high reduction, high efficiency ambidextrous window lift motor of the type disclosed in U.S. Pat. No. 7,098,562, the content of which is hereby incorporated by reference into this specification. Thus, by using the specially designed face gear 44 and face gear pinion 26, motor performance is equal in both operating directions. Although the motor assembly 10 is disclosed for window lift application, the motor can be employed in any application requiring a fractional horsepower, permanent magnet DC motor.

As can be appreciated, the motor assembly 10 reduces material and reduces manufacturing cost.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor assembly comprising:
   a permanent magnet DC motor having a shaft mounted for rotation,
   a face gear pinion associated with the shaft,
   a jack shaft and clutch assembly associated with the face gear pinion and constructed and arranged to prevent back drive of the motor, the jack shaft and clutch assembly comprising a face gear operatively associated with the face gear pinion such that during a normal operating condition, movement of the face gear pinion rotates the face gear,
   one of a spur or helical pinion operatively associated with the jack shaft and clutch assembly,
   a drive member operatively associated with the spur or helical pinion such that movement of the shaft and face gear pinion moves the spur or helical pinion to drive the drive member, and
   housing structure defined by an upper housing joined with a lower housing, the motor, the face gear pinion, the jack shaft and clutch assembly, the spur or helical pinion and the drive member being housed within the housing structure,
   wherein only one of the upper or lower housings includes mounting structure constructed and arranged to mount the motor assembly to another object.

2. The assembly of claim 1, wherein the upper and lower housing are separable along a plane that is coincident to an axis of the shaft.

3. The assembly of claim 1, wherein the motor further includes brushes, the brushes being supported directly in one of the upper or lower housings.

4. The assembly of claim 3, wherein the brushes are in the form of leaf springs.

5. The assembly of claim 3, wherein one of the upper or lower housings includes an electrical connector connected with the brushes, the electrical connector being constructed and arranged to interface with another connector.

6. The assembly of claim 5, wherein the electrical connector is integral with one of the upper or lower housings.

7. The assembly of 1, wherein each of the upper and lower housings includes a pocket that receives a portion of the motor.

8. The assembly of claim 1, further including seal structure around a periphery of a surface of at least one of the upper or lower housings, the surface being constructed and arranged to mate with a surface of the upper or lower housing that does not include the seal structure.

9. The assembly of claim 1, wherein the jack shaft and clutch assembly comprises:
 a jack shaft, with the spur or helical pinion coupled with the jack shaft,
 a cam fixedly coupled to the jack shaft,
 a clutch plate mounted on the jack shaft for rotation with respect to the jack shaft, and
 follower structure operatively associated with the cam,
 wherein the movement of the face gear pinion that rotates the face gear causes rotation of the cam and jack shaft so as to drive the spur or helical pinion and thus the drive member,
 whereby during a back drive condition of the motor, when the spur or helical pinion is driving and torque is transmitted to the jack shaft and thus to the cam, the cam causes the follower structure to contact and exert pressure on a surface of one of the housings thereby preventing rotation of the clutch shaft.

10. The assembly of claim 9, wherein each of the spur or helical pinion and face gear includes one of a gear or a pulley.

11. The assembly of claim 1, wherein the mounting structure is constructed and arranged to mount the motor assembly with respect to a portion of a vehicle so that the motor assembly can move a window of the vehicle when the drive member is associated with the window.

\* \* \* \* \*